United States Patent Office 3,746,739
Patented July 17, 1973

3,746,739
CARBAMATE ESTERS OF DICHLORO-NITRO-ALKOXY- AND DICHLORO-NITRO-HYDROXY-ALKOXY-PHENOLS
R. Garth Pews and Ralph M. Rodia, Midland, Mich., assignors to The Dow Chemical Company, Midland, Mich.
No Drawing. Filed Oct. 2, 1970, Ser. No. 77,705
Int. Cl. C07c 125/06
U.S. Cl. 260—468 E                                      8 Claims

ABSTRACT OF THE DISCLOSURE

Novel carbamate esters of dichloro-nitro-alkoxy- and dichloro-nitro-hydroxyalkoxy-phenols are prepared by the reaction of a substituted isocyanate compound with a dichloro-nitro-alkoxy- or dichloro-nitro-hydroxyalkoxyphenol compound in the presence of an inert carrier as a reaction medium at a temperature of from about 0 to about 100° C. The novel compounds are suitable for use as fungicides and as the active agents in fungicidal compositions.

SUMMARY OF THE INVENTION

The present invention is directed to novel carbamate esters of dichloro-nitro-alkoxy- and dichloro-nitro-hydroxyalkoxy-phenol compounds and to methods for their preparation. The novel compounds of the present invention are represented by the following structural formula:

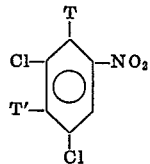

wherein

T and T' each independently represent

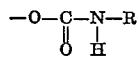

or OR', with the proviso that one of T and T' is always OR';
R is a member of the group consisting of lower alkyl, cycloalkyl, alkylene, phenyl, and halophenyl; and
R' represents loweralkyl or hydroxy-loweralkyl groups of from 1 to about 4, both inclusive, carbon atoms.

As used herein, the term "loweralkyl" means saturated, monovalent aliphatic-radicals, including straight and branched-chain radicals of from one to about 6 carbon atoms, as illustrated by, but not limited to, methyl, ethyl, propyl, isopropyl, butyl, sec.-butyl, amyl, hexyl, and the like.

As used herein, the term "cycloalkyl" means cyclic, saturated aliphatic-radicals of from three to eight carbon atoms, illustrated by, but limited to, cyclopropyl, cyclobutyl, 2-methylcyclobutyl, cyclohexyl, 4-methylcyclohexyl, cyclooctyl, and the like.

The term "alkylene" as employed in the present specification and claims refers to straight-chain divalent radicals as well as to branched-chain divalent radicals of from 2 to about 6 carbon atoms, as illustrated by, but not limited to ethylene, propene, 1- or 2-butene, 1- or 2-pentene, trimethylethylene, hexene, tetramethylethylene, and the like.

As used herein, the term "halophenyl" means a phenyl radical ring substituted with from 1 to about 3 substituents such as chlorine, bromine, fluorine, and the like.

The products of the present invention are crystalline solids and are of low solubility in water and of varying degrees of solubility in many common organic solvents. The novel compounds are suitable for use as fungicides and are especially adapted to be employed as active toxicants in compositions employed for the control of various fungal organisms.

The novel compounds of the present invention are prepared by a novel process wherein a dichloro-nitro-alkoxy- or a dichloro-nitro-hydroxyalkoxy- phenol compound (each referred to hereinafter as a "phenol reactant") of the formula:

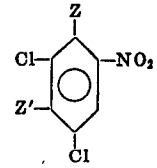

is reacted with a substituted isocyanate reactant of the formula:

$$R\text{—}N\text{=}C\text{=}O$$

wherein, in the above and succeeding formulas,

Z and Z' each independently represent —OH or OR', with the proviso that one of Z and Z' is always —OH; and
R and R' are as hereinbefore defined.

The reaction of the phenol and isocyanate reactants is conveniently carried out in the presence of an inert carrier as a reaction medium. Representative and suitable inert carriers which can be employed as reaction media include carbon tetrachloride, chloroform, dimethylformamide, benzene, acetonitrile and the like. In order to decrease reaction time, a small amount of an actuating agent, e.g., triethylamine, pyridine and the like, can be incorporated into the reaction mixture. In the present invention, the use of such actuating agents is preferred. The reaction proceeds readily at temperatures between 0 and 100° C.; generally, the reaction mixture can be heated at the boiling temperature under reflux. The pressure is not critical and is usually maintained at ambient atmosphere pressure.

In carrying out the reaction, the reactants are contacted with one another in a reaction medium as described. Typically, the phenol reactant and actuating agent are dispersed in a liquid reaction medium and the isocyanate reactant is added dropwise thereto. The resulting reaction mass is generally maintained at the boiling temperature under reflux for a sufficient period of time to allow substantial completion of the reaction, usually from about 1 to about 4 hours. Following the substantial completion of the reaction, the reaction mass is cooled and filtered to remove the product precipitate formed during the course of the reaction. The crystalline product thus obtained can be further purified by conventional techniques which include washing with a liquid which is a solvent for impurities but not for the product, recrystallization, and the like.

DESCRIPTION OF THE PREFERRED EMBODIMENTS

The following examples illustrate the invention but are not to be construed as limiting the same.

EXAMPLE 1

2,4-dichloro-3-methoxy-6-nitrophenol (8.5 grams; 0.028 mole) was dissolved in 150 milliliters of carbon tetrachloride and 10 drops of triethylamine was added thereto. Methyl isocyanate (4.0 milliliters) was added to the solution dropwise over a period of from about 3 to about 10 minutes and the resulting reaction mass was heated at the boiling point under reflux for a period of about 1 hour. Following the substantial completion of the reaction, the reaction mass was cooled and filtered to obtain the 2,4-dichloro-3-methoxy-6-nitrophenyl methylcarbamate as a crystalline solid. Recrystallization from a hexane-methylenechloride solution gave the product as a white crystalline solid having a melting point of 166–168° C. Elemental analysis calculated for $C_9H_8O_5Cl_2N_2$ (percent): C, 36.64; H, 2.71; Cl, 24.03; N, 9.49. Found (percent): C, 36.7; H, 3.01; Cl, 24.4; N, 9.60.

Other representative compounds of the present invention are prepared according to the procedures reported in Example 1 above, using the respective corresponding phenol and isocyanate reactants. These products are identified in Table I which follows wherein T, T', R and R' have the same significance as set forth hereinbefore, M.P. is the melting point and M.W. is molecular weight.

TABLE I

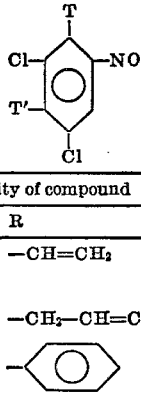

| Example number | T | T' | R | R' | Characterizing property |
|---|---|---|---|---|---|
| 2 | —O—C(=O)—N(H)—R | —O—R' | —CH=CH₂ | —CH₃ | M.P. 122-124° C. |
| 3 | Same | Same | —CH₂—CH=CH₂ | —CH₃ | M.P. 133-136° C. |
| 4 | do | do | —C₆H₅ (phenyl) | —CH₃ | M.P. 130-133° C. |
| 5 | do | do | —C₆H₁₁ (cyclohexyl) | —CH₃ | M.P. 138-140° C. |
| 6 | do | do | —C₆H₄Cl (chlorophenyl) | —CH₃ | M.P. 124-126° C. |
| 7 | —O—R' | —O—C(=O)—N(H)—R | Same | —CH₃ | M.P. 124-126° C. |
| 8 | Same | Same | —C₃H₇ | C₂H₅ | M.W. 337. |
| 9 | do | do | n-C₆H₁₃ | n-C₄H₉ | M.W. 407. |
| 10 | do | do | Sec.-C₄H₉ | —n-C₃H₆OH | M.W. 381. |
| 11 | do | do | —C₆H₁₁ (cyclohexyl) | —C₂H₅ | M.W. 349. |
| 12 | do | do | —C₆H₁₁ (cyclohexyl) | —C₃H₆OH | M.W. 407. |
| 13 | do | do | —C₇H₁₃ (cycloheptyl) | —C₄H₉ | M.W. 433. |
| 14 | do | do | —CH₂CH=CH₂ | —C₂H₅ | M.W. 335. |
| 15 | do | do | —CH₂(CH₂)₃CH=CH₂ | —C₃H₇ | M.W. 391. |
| 16 | do | do | —CH₂(CH₂)₂CH—CH₂ | —C₂H₄OH | M.W. 393. |
| 17 | do | do | —CH₂CH=CHCH₃ | —C₂H₄OH | M.W. 365. |
| 18 | do | do | —C₆H₃Cl₂ (dichlorophenyl) | —C₃H₇ | M.W. 454. |
| 19 | do | do | —C₆H₃Br₂ (dibromophenyl) | —C₃H₆OH | M.W. 559. |
| 20 | do | do | —C₆H₂Cl₃ (trichlorophenyl) | —C₄H₉ | M.W. 502.5. |
| 21 | —O—C(=O)—N(H)—R | —O—R' | —C₃H₇ | —C₃H₇ | M.W. 351. |
| 22 | Same | Same | —C₆H₁₃ | —C₄H₉ | M.W. 407. |
| 23 | do | do | —C₄H₉ | —C₂H₄OH | M.W. 381. |
| 24 | do | do | —C₆H₁₁ (cyclohexyl) | —C₃H₇ | M.W. 363. |

TABLE II—Continued

| Example number | T | T' | R | R' | Characterizing property |
|---|---|---|---|---|---|
| 25 | do | do | ⬡-H (cyclohexyl) | —$C_3H_6OH$ | M.W. 407. |
| 26 | do | do | ⬡-H (cycloheptyl) | —$C_4H_9$ | M.W. 433. |
| 27 | do | do | —$CH_2CH=CH_2$ | —$C_4H_8OH$ | M.W. 379. |
| 28 | do | do | —$CH_2(CH_2)_3CH=CH_2$ | —$C_3H_7$ | M.W. 391. |
| 29 | do | do | —$CH_2(CH_2)_2CH=CH_2$ | —$C_3H_6OH$ | M.W. 393. |
| 30 | do | do | —$CH_2CH=CHCH_3$ | —$C_2H_4OH$ | M.W. 365. |
| 31 | do | do | -⬡ with 2 Cl | —$C_3H_7$ | M.W. 454. |
| 32 | do | do | -⬡ with 2 Br | —$C_3H_6OH$ | M.W. 559. |
| 33 | do | do | -⬡ with 3 Cl | —$C_4H_9$ | M.W. 502.5. |

The compounds of the present invention are suitable for use in the control of various fungal organisms. This is not to suggest, however, that the compounds claimed and compositions containing them are equally effective at similar concentrations or against the same fungal organisms. For such use, the unmodified substance can be utilized. However, the present invention also embraces the use of the compounds in formulations. Thus, for example, a compound can be dispersed on a finely divided solid and employed therein as a dust. Also, the compounds, or a solid composition comprising the compound, can be dispersed in water, typically with the aid of a wetting agent, and the resulting aqueous suspension employed as a spray. In other procedures, the compound can be employed as a constituent of organic liquid compositions, oil-in-water and water-in-oil emulsions, or water dispersions, with or without the addition of wetting, dispersing, or emulsifying agents.

The exact concentration of the toxic constituent to be employed in the treating compositions is not critical and may vary considerably provided the fungal pests and/or their habitats are contacted with an effective amount of the toxicant. Good results are obtained when compositions containing controlling and fungicidal concentrations, usually from about 500 to 10,000 parts per million by weight of one or more of the compounds, are employed. The concentration of toxicants in liquid compositions generally is from about 1.0 to about 50 percent by weight. Concentrations up to 95 weight percent are often employed. In dusts, the concentration of the toxicant can be from about 1.0 to 10 weight percent; however, concentrations up to 95 weight percent are often conveniently employed. In compositions to be employed as concentrates, the toxicant can be present in a concentration of from 5 to 98 weight percent.

In representative operations, numerous compositions containing 500 parts of one of the compounds of the present invention as sole toxicant per million parts by weight of ultimate treating composition were prepared and separately applied to the environments containing and supporting thriving members of one of a variety of fungal organisms. The results of the evaluations of the compounds tested at the above concentration and the percent control of the organisms treated are set forth in the following Table II.

TABLE II

| Compound number | Subject compound | S.a. | T.m. | B.s. | C.p. | P.p. | S.t. | M.p. | R.n. | C.f. | A.t. |
|---|---|---|---|---|---|---|---|---|---|---|---|
| 1 | 2,4-dichloro-3-methoxy-6-nitrophenyl methylcarbamate | 100 | 100 | 100 | 100 | 100 | 100 | 100 | 100 | 100 | 100 |
| 2 | 2,4-dichloro-3-methoxy-6-nitrophenyl vinylcarbamate | 100 | 100 | 100 | 100 | 100 | 100 | 100 | 100 | 100 | 100 |
| 3 | 2,4-dichloro-3-methoxy-6-nitrophenyl allylcarbamate | 100 | 100 | 100 | 100 | 100 | 100 | 100 | 100 | 50 | 100 |
| 4 | 2,4-dichloro-3-methoxy-6-nitrophenyl carbanilate | 100 | 100 | 100 | 100 | 100 | 100 | 100 | 100 | 100 | 100 |
| 5 | 2,4-dichloro-3-methoxy-6-nitrophenyl cyclohexanecarbamate | 100 | 100 | 100 | 100 | 100 | 100 | 100 | 100 | 50 | 100 |
| 6 | 2,4-dichloro-3-methoxy-6-nitrophenyl m-chlorocarbanilate | 100 | 100 | 100 | 100 | 100 | 50 | 100 | 100 | 0 | 50 |
| 7 | 2,6-dichloro-3-methoxy-4-nitrophenyl m-chlorocarbanilate | 100 | 100 | 100 | 0 | 0 | 100 | 100 | 50 | 0 | 0 |

NOTE.—S.a.=Staphylococcus aureus; T.m.=Trichophyton mentagrophytes; B.s.=Bacillus subtilis; C.p.=Candida pelliculosa; P.p.=Pullularia pullulans; S.t.=Salmonella typhosa; M.p.=Mycobacterium phlei; R.n.=Rhizopus nigricans; C.f.=Cephaloascus fragans; A.t.=Aspergillus terreus.

The dichloro-nitro-alkoxy- and dichloro-nitro-hydroxyalkoxy-phenols employed as starting materials in the present invention are prepared by reacting 2,3,4,5-tetrachloronitrobenzene with a predetermined lower alkanol or lower glycol in the presence of potassium hydroxide. The reaction is carried out at the boiling temperature of the mixture under reflux conditions for a period of about one-half hour. The product thus obtained represents a mixture of about 75% potassium 2,4-dichloro-3-(alkoxy- or hydroxyalkoxy-)-nitro-phenolate and about 25% 2,6-dichloro-3-(alkoxy- or hydroxy-alkoxy-)-4-nitrophenolate. Separation of the respective phenolates and subsequent treatment with concentrated hydrochloric acid yields the corresponding dichloro-nitro-(alkoxy- or hydroxyalkoxy-)phenol compounds.

The substituted isocyanate compounds of the type employed as starting materials in the present invention are known and can be prepared by conventional methods or readily obtained from commercial sources.

We claim:
1. Compounds corresponding to the formula:

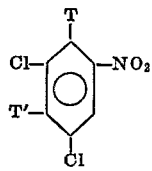

wherein

T and T' each independently represent

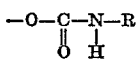

or OR', with the proviso that one of T and T' is always OR' and the other T or T' is

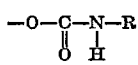

R represents a member of the group consisting of loweralkyl groups containing from 1 to about 6 carbon atoms, inclusive, cycloalkyl groups containing from 3 to about 8 carbon atoms, inclusive, alkylene groups containing from 2 to about 6 carbon atoms, inclusive, phenyl and halophenyl, in which halophenyl refers to phenyl groups substituted with from 1 to about 3 substituents selected from the group consisting of bromine, chlorine and fluorine; and R' represents a member of the group consisting of loweralkyl and hydroxyloweralkyl groups containing from 1 to about 4 carbon atoms, inclusive.

2. A compound according to claim 1 which is 2,4-dichloro-3-methoxy-6-nitrophenyl methylcarbamate.
3. A compound according to claim 1 which is 2,4-dichloro-3-methoxy-6-nitrophenyl vinylcarbamate.
4. A compound according to claim 1 which is 2,4-dichloro-3-methoxy-6-nitrophenyl allylcarbamate.
5. A compound according to claim 1 which is 2,4-dichloro-3-methoxy-6-nitrophenyl carbanilate.
6. A compound according to claim 1 which is 2,4-dichloro-3-methoxy-6-nitrophenyl cyclohexanecarbamate.
7. A compound according to claim 1 which is 2,4-dichloro-3-methoxy-6-nitrophenyl m-chlorocarbanilate.
8. A compound according to claim 1 which is 2,6-dichloro-3-methoxy-4-nitrophenyl m-chlorocarbanilate.

References Cited
UNITED STATES PATENTS 3,308,018  3/1967  Giek et al. _____ 260—471 C
3,577,453  5/1971  Rohr et al. _____ 260—471 C LORRAINE A. WEINBERGER, Primary Examiner L. THAXTON, Assistant Examiner U.S. Cl. X.R.

71—106, 111; 260—471 C, 479 C